(12) United States Patent
Burr (10) Patent No.: US 11,270,194 B2
(45) Date of Patent: Mar. 8, 2022

(54) SYSTEM AND METHOD FOR CONSTRUCTING SYNAPTIC WEIGHTS FOR ARTIFICIAL NEURAL NETWORKS FROM SIGNED ANALOG CONDUCTANCE-PAIRS OF VARYING SIGNIFICANCE

(71) Applicant: INTERNATIONAL BUSINESS MACHINES CORPORATION, Armonk, NY (US)

(72) Inventor: Geoffrey W Burr, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 977 days.

(21) Appl. No.: 15/660,945

(22) Filed: Jul. 26, 2017

(65) Prior Publication Data
US 2019/0034788 A1 Jan. 31, 2019

(51) Int. Cl.
*G06N 3/063* (2006.01)
*G06N 3/04* (2006.01)
*G06N 3/08* (2006.01)

(52) U.S. Cl.
CPC ............. *G06N 3/063* (2013.01); *G06N 3/04* (2013.01); *G06N 3/0635* (2013.01); *G06N 3/084* (2013.01)

(58) Field of Classification Search
CPC ........... G06N 3/063; G06N 3/04; G06N 3/084
See application file for complete search history.

(56) References Cited

U.S. PATENT DOCUMENTS 5,083,044 A * 1/1992 Mead ............... G06N 3/063 327/94
6,032,140 A * 2/2000 Fabbrizio ........... G06N 3/0635 706/15

(Continued)

FOREIGN PATENT DOCUMENTS

CN 103078054 A 5/2013
CN 103078055 A 5/2013

(Continued)

OTHER PUBLICATIONS

Wu, Xinyu "Analog Spiking Neuromorphic Circuits and systems for . . . cognitive computing" Boise State PhD [Published 2016] [Retrieved Sep. 2020] <URL: https://scholarworks.boisestate.edu/cgi/viewcontent.cgi?referer=https://scholar.google.com/&httpsredir=1&article=2276&context=td (Year: 2016).*

(Continued)

*Primary Examiner* — Ann J Lo
*Assistant Examiner* — Fen Christopher Tamulonis
(74) *Attorney, Agent, or Firm* — Cantor Colburn LLP; Randall Bluestone (57) ABSTRACT

Artificial neural networks (ANNs) are a distributed computing model in which computation is accomplished with many simple processing units, called neurons, with data embodied by the connections between neurons, called synapses and by the strength of these connections, the synaptic weights. An attractive implementation of ANNs uses the conductance of non-volatile memory (NVM) elements to record the synaptic weight, with the important multiply—accumulate step performed in place, at the data. In this application, the non-idealities in the response of the NVM such as nonlinearity, saturation, stochasticity and asymmetry in response to programming pulses lead to reduced network performance compared to an ideal network implementation. A method is shown that improves performance by distributing the syn- (Continued)

aptic weight across multiple conductances of varying significance, implementing carry operations between less-significant signed analog conductance-pairs to more-significant analog conductance-pairs.

17 Claims, 7 Drawing Sheets

(56) References Cited

U.S. PATENT DOCUMENTS

| | | | |
|---|---|---|---|
| 8,811,060 | B2 | 8/2014 | Burr et al. |
| 2012/0330872 | A1 | 12/2012 | Esser et al. |
| 2014/0129498 | A1 | 5/2014 | Bichler et al. |
| 2015/0019468 | A1 | 1/2015 | Nugent et al. |
| 2015/0106316 | A1 | 4/2015 | Barsimantov et al. |
| 2015/0178618 | A1 | 6/2015 | Nogaret |
| 2017/0154259 | A1 | 6/2017 | Kara et al. |

FOREIGN PATENT DOCUMENTS

| | | |
|---|---|---|
| EP | 768610 | 4/1997 |
| JP | 2000057244 A | 2/2000 |
| WO | 2010133925 | 11/2010 |
| WO | 2013167780 | 11/2013 |
| WO | 2014106351 A1 | 7/2014 |
| WO | 2014106352 A1 | 7/2014 |

OTHER PUBLICATIONS

Bartolozzi et al. "Synaptic Dynamics in Analog VLSI" MIT Press [Published 2007] [Retreived Sep. 2020] <URL: https://www.mitpressjournals.org/doi/pdf/10.1162/neco.2007.19.10.2581 (Year: 2007).*

Indiveri, Giacomo et al. "Neuromorphic Silicon neuron Circuits" Frontiers in Neuroscience [Published 2011] [Retreived Sep. 2020] <URL: https://www.frontiersin.org/articles/10.3389/fnins.2011.00073/full> (Year: 2011).*

C. Liu et al., "A Memristor Crossbar Based Computing Engine Optimized for High Speed and Accuracy," 2016 IEEE Computer Society Annual Symposium on VLSI (ISVLSI), Pittsburgh, PA, USA, 2016, pp. 110-115, doi: 10.1109/ISVLSI.2016.46. (Year: 2016).*

Valle, M., Caviglia, D.D. & Bisio, G.M. An experimental analog VLSI neural network with on-chip back-propagation learning. Analog Integr Circ Sig Process 9, 231-245 (1996). https://doi.org/10.1007/BF00194907 (Year: 1996).*

D. Strukov, F. Merrikh-Bayat, M. Prezioso, X. Guo, B. Hoskins and K. Likharev, "Memory Technologies for Neural Networks," 2015 IEEE International Memory Workshop (IMW), 2015, pp. 1-4, doi: 10.1109/IMW.2015.7150295. (Year: 2015).*

Castellani et al., "A model of bidirectional synaptic plasticity: from signaling network to channel conductance," Learning & Memory, V12, pp. 423-432.

Burr et al., "Experimental demonstration and tolerancing of a large-scale neural network (165,00 synapse), using phase-change memory as the synaptic weight element," IEEE Transactions on Electron Devices, Nov. 2015, 62:11, pp. 3498-3507.

Suri et al., "Phase Change Memory as Synapse for Ultra-Dense Neuromorphic Systems: Application to Complex Visual Pattern Extraction," IEDM Technical Digest, 1988, Dec. 2011, 4:4, pp. 79-82.

Rumelhart et al., "Learning internal representations by error propagation," Parallel distributed processing: explorations in the microstructure of cognition, vol. 1, MIT Press Cambridge, 1986, pp. 318-362.

Examination Report for United Kingdom Application No. GB2001857.8 dated Sep. 28, 2021, 2 pages.

Agarwal, S. et al., "Achieving Ideal Accuracies in Analog Neuromorphic Computing Using Periodic Carry," Jun. 2017, Symposium on VLSI Technology Digest of Technical Papers, Konferenzdatum, vol. 5(8), 2 pages.

Office Action for German Application No. 112018002950.6 dated Jul. 13, 2021, 13 pages.

Notice of Reasons for Refusal dated Oct. 22, 2021 for Japanese Patent Application No. 2020-502380, 2 pages.

* cited by examiner

FIG. 1

PRIOR ART

FIG. 7

SYSTEM AND METHOD FOR CONSTRUCTING SYNAPTIC WEIGHTS FOR ARTIFICIAL NEURAL NETWORKS FROM SIGNED ANALOG CONDUCTANCE-PAIRS OF VARYING SIGNIFICANCE

BACKGROUND OF THE INVENTION

Field of Invention

The present invention relates generally to the field of Artificial Neural Networks (ANNs). More specifically, the present invention is related to a system and method for constructing synaptic weights for artificial neural networks from signed analog conductance-pairs of varying significance.

Discussion of Related Art

Artificial Neural Networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it, and thus by the outputs of these "upstream" connected neurons and the strength of the connections as determined by the synaptic weights. The ANN is trained to solve a specific problem (e.g., pattern recognition) by adjusting the weights of the synapses such that a particular class of inputs produces a desired output. The weight adjustment procedure is known as "learning." There are many algorithms in the ANN literature for performing learning that are suitable for various tasks such as image recognition, speech recognition, language processing, etc. Ideally, these algorithms lead to a pattern of synaptic weights that, during the learning process, converges toward an optimal solution of the given problem.

Figure 1:
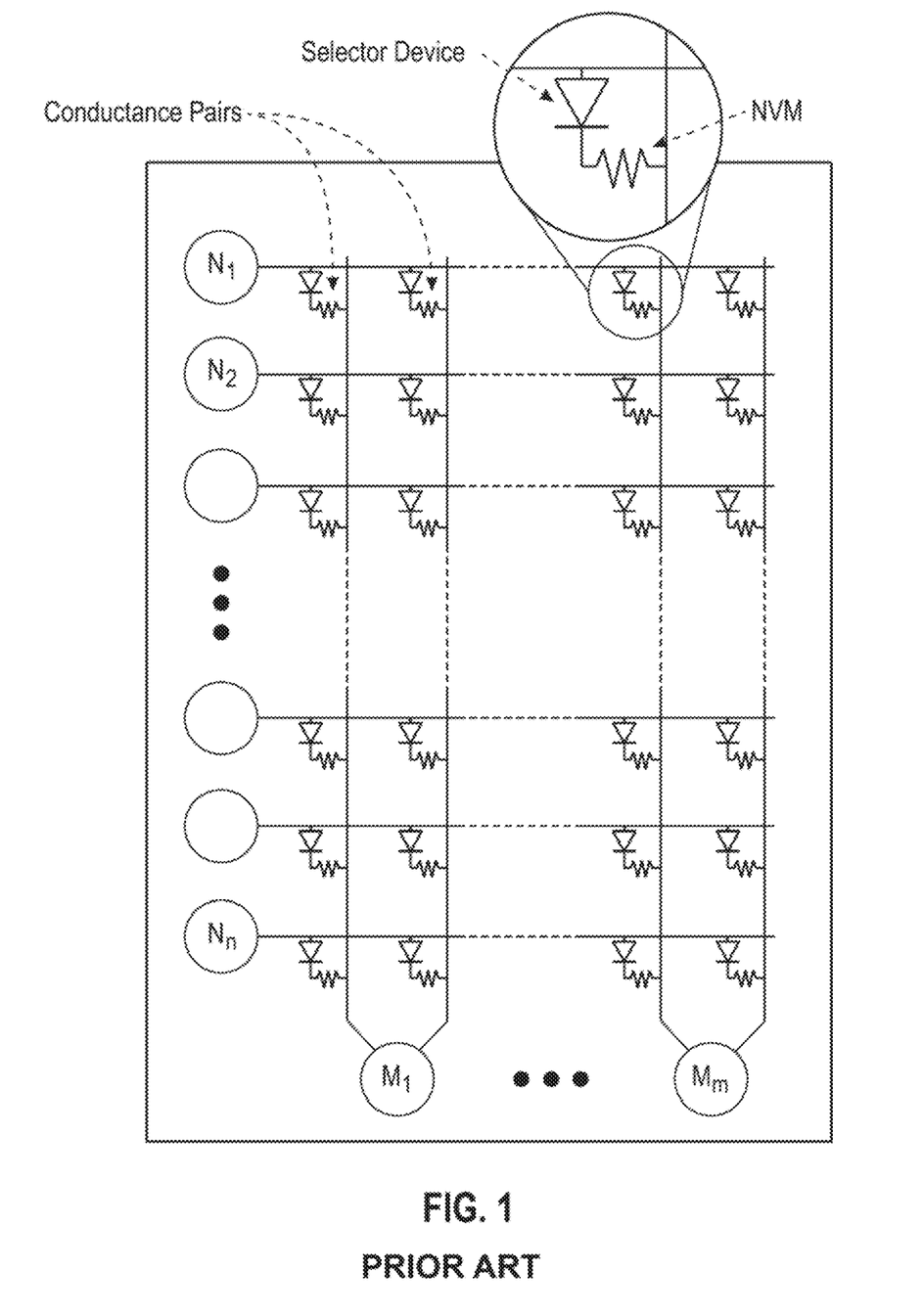
FIG. 1 illustrates a prior art array with one conductance-pair per synapse.

An attractive implementation of ANNs uses some (e.g., CMOS) circuitry to represent the neuron, the function of which is to integrate or sum the aggregate input from upstream neurons to which a particular neuron is connected, and apply some nonlinear function of the input to derive the output of that neuron. Because in general, each neuron is connected to some large fraction of the other neurons, the number of synapses (connections) is much larger than the number of neurons; thus, it is advantageous to use some implementation of synapses that can achieve very high density on a neuromorphic computing chip. One attractive choice is some non-volatile memory (NVM) technology, such as resistive random access memory (RRAM) or phase-change memory (PCM). Since both positive and negative (i.e., excitatory and inhibitory) weights are desired, one scheme uses a pair of NVM to represent the weight as the difference in conductance between the two (see M. Suri et al., "Phase Change Memory as Synapse for Ultra-Dense Neuromorphic Systems: Application to Complex Visual Pattern Extraction," *IEDM Technical Digest*, 4.4, 2011). This scheme is shown in FIG. 1. The outputs of the upstream $N_i$ neurons are summed in parallel through pairs of NVM conductances into the positive and negative inputs of the downstream $M_i$ neurons. This parallelism is highly advantageous for efficient computation.

During learning, the conductances of the NVM elements are programmed by sending them pulses that can either increase or decrease the conductance according to a learning rule. One common learning rule that we have investigated is backpropagation (see Rumelhart et. al., "Learning Internal Representations by Error Propagation," Parallel Distributed Processing: Explorations in the Microstructure of Cognition, Vol 1, 1986), which is used extensively in deep learning networks that are currently being implemented on graphical processing units (GPU's) for image recognition, learning to play video games, etc. The backpropagation algorithm calls for a weight update $\Delta w_{ij} = \eta \cdot x_i \cdot \delta_j$ that is proportional to the product of the output of the upstream neuron $x_i$ and the error contribution from the downstream neuron $\delta_j$ with the proportionality constant $\eta$ known as the learning rate. We have previously shown (see Burr et al., "Experimental demonstration and tolerancing of a large scale neural network (165,000 synapses), using phase-change memory as the synaptic weight element," IEDM Technical Digest, 2014) that this "crossbar-compatible" learning rule is just as effective as the conventional backpropagation rule.

Any real NVM element has a non-ideal response. It is nonlinear and has a limit to the maximum conductance it can achieve. The conductance change to a pulse designed to increase conductance is different from that of a pulse designed to decrease conductance, i.e., the response is asymmetric. There are variations among devices, some devices will be inoperable, either stuck in a high conductance state or stuck in a low conductance state. Our work has shown that many of these defects cause very little decrease in ANN performance. However, nonlinearity, bounded conductance and asymmetric response cause a reduction in accuracy for the MNIST digit recognition problem, from 99+% accuracy during training to between 80% and 85%.

During training, many different inputs are presented to the network, and the backpropagation learning rule is used to update the NVM conductances after each input (or after some small number of inputs, called a minibatch). Some weights in the network tend to evolve steadily toward some stable value, while others tend to dither up and down, sometimes increasing, other times decreasing. When the NVM response is nonlinear or asymmetric, the response to a pulse intended to decrease the weight value will usually be stronger than one intended to increase the weights. This tends to push many of these weights towards zero, making the backpropagation learning rule ineffective and decreasing network performance.

The prior art has been concerned with the introduction of signed synaptic weights based on two conductances. However, for some NVM devices such as phase-change memory (PCM), filament-based RRAM (such as using HfOx or TaOx), or Conductive-Bridging RAM based on metal-filaments, small conductance changes can be only implemented in one direction. As a direct result of this, a synaptic weight that is large in magnitude tends to be extremely fragile, responding well to steps in its smaller conductance (which decrease weight magnitude) but responding poorly to steps in its larger conductance (which increases weight magnitude). Thus, network performance degrades because the weights that the network wants to make large have a difficult time staying large.

Embodiments of the present invention are an improvement over prior art systems and methods.

SUMMARY OF THE INVENTION

In one embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the synaptic weight of each synapse being represented by a weighted current flow from multiple conductance-pairs, where a plurality of training examples are serially input to the ANN while observing its output, where a backpropagation algorithm updates the synaptic weight in response to the difference between the output from a given layer and a desired output from said given layer, the method comprising: (a) periodically transferring a portion of the synaptic weight from a conductance-pair of lower significance to a conductance-pair of higher significance, such that the total synaptic weight remains substantially unchanged; and (b) repeating the training examples until the network output approaches the desired output within a predetermined accuracy.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weighted current flow from multiple conductance pairs, each of the multiple conductance pairs representing a joint contribution and having a higher-significance conductance-pair and a lower-significance conductance-pair, where a plurality of training examples are serially input to the ANN while observing its output, where a backpropagation algorithm updates the synaptic weight in response to a difference between the output from a given layer and a desired output from said given layer, the method comprising: (a) pausing network training and measuring conductances across analog memory elements in the ANN network; (b) identifying an effective synaptic weight value in one or more measured conductances in the conductance pairs whose absolute value is greater than its paired conductance by a predetermined amount; and (c) reconfiguring the lower-significance conductance pairs to be equal, corresponding to a zero joint contribution towards an overall synaptic weight, and reconfiguring one of the more-significant conductance pairs until the identified effective synaptic weight value is obtained.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weighted current flow from multiple conductance pairs, each of the multiple conductance pairs representing a joint contribution and having a higher-significance conductance-pair and a lower-significance conductance-pair, where a plurality of training examples are serially input to the ANN while observing its output, where a backpropagation algorithm updates the synaptic weight in response to a difference between the output from a given layer and a desired output from said given layer, the method comprising: (a) pausing network training and measuring conductances across analog memory elements in the ANN network; (b) identifying an effective synaptic weight value in one or more measured conductance in the conductance pairs whose absolute value is greater than its paired conductance by a predetermined amount; and (c) reconfiguring the lower-significance conductance pairs to be equal, corresponding to a zero joint contribution towards an overall synaptic weight, and reconfiguring one of the more-significant conductance pairs until the identified effective synaptic weight value is obtained, and wherein some of the synaptic weights in the ANN are implemented using a capacitor tied to the gate of a read transistor, the gate of the read transistor also tied to a first set of programming transistors for adding charge to the capacity and a second set of transistors for subtracting charge from the capacitor, the adding or subtracting done according to signals associated with the downstream and upstream neurons.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

While this invention is illustrated and described with respect to preferred embodiments, the invention may be produced in many different configurations. There is depicted in the drawings, and will herein be described in detail, preferred embodiments of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The invention described here helps mitigate the effects of nonlinearity and asymmetry in conductance response by distributing the synaptic weight across multiple pairs of conductances, each of varying significance. Each pair contributes in the usual way towards synaptic weight through the difference between an excitatory conductance, G+, and an inhibitory conductance, G−. However, the contribution of each pair varies in the amplification factor implemented at the end of the bit lines where these pairs are summed. Example-by-example programming can be implemented in many ways—in one particular manifestation, the least-significant conductance pair is updated during network training. Since much of the weight value is typically contained in the more-significant conductance pair, one or more of the less-significant conductance pairs could be comprised of volatile analog memory elements, such as a capacitor tied to the gate of a read transistor. In this case, adding or subtracting charge to the capacitor changes the gate voltage of the read transistor and thus its effective conductance. In the case of conductance values that are fully bidirectional and thus capable of being programmed both up and down in conductance, one of the conductances in each conductance pair could be shared across many different synapses, with all individual synaptic programming taking place by adjusting the non-shared conductance.

Figure 2:
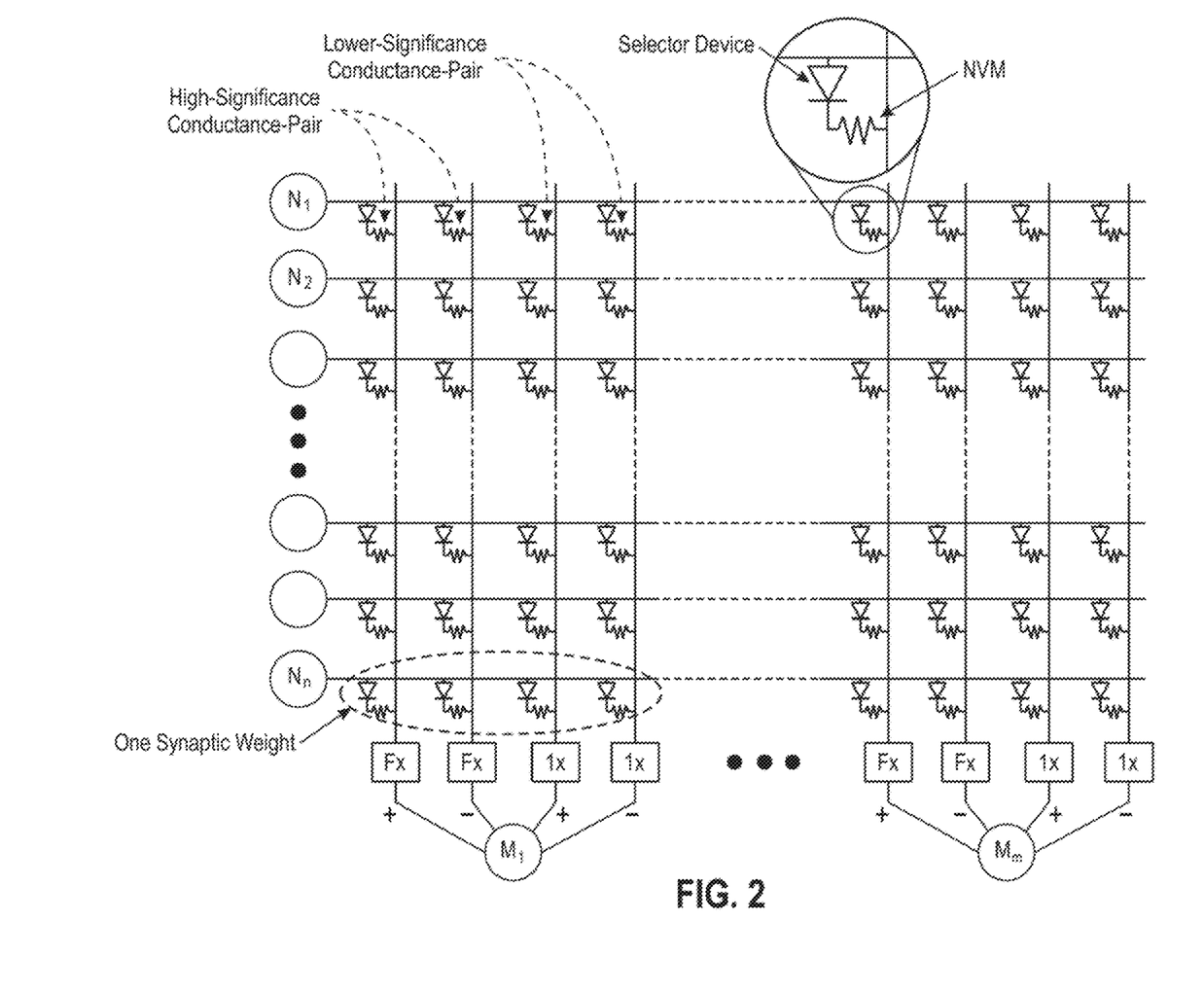
FIG. 2 depicts an array having more than one conductance-pair per synapse, with one set of pairs having its read-current amplified with respect to the other by a factor of F.

FIG. 2 discloses an array having more than one conductance-pair per synapse, with one set of pairs having its read-current amplified with respect to the other by a factor of F. In this figure, each synaptic weight is comprised of two pairs of conductances. The first pair contributes to the summed current of its downstream neuron at the bottom of the array with a gain factor of F with respect to the second pair. This implies that a large conductance difference in the second pair has the same contribution to the overall synaptic weight as a small conductance difference in the first pair. Thus, this technique increases the total dynamic range of the overall synapse, and allows a fast but volatile analog memory element exhibiting more linear and symmetric conductance change to be used as the second or lower-significance conductance pair for ANN example-by-example programming, with the accumulated synaptic weight change occasionally transferred carefully into the first conductance pair. Note that this is NOT a direct match to more or less significant bits of a digital word, since here there are multiple analog configurations of the multiple conductances that represent exactly the same overall synaptic weight. Similarly, the transfer operation from lower to higher significance conductance pair is not the same as a digital "carry" operation in a digital adder, and can be delayed as needed because of the redundancy in mapping of analog configurations to overall synaptic weight. Although the figure shows two conductance pairs, extension to three or more pairs would of course be possible.

Figure 3:
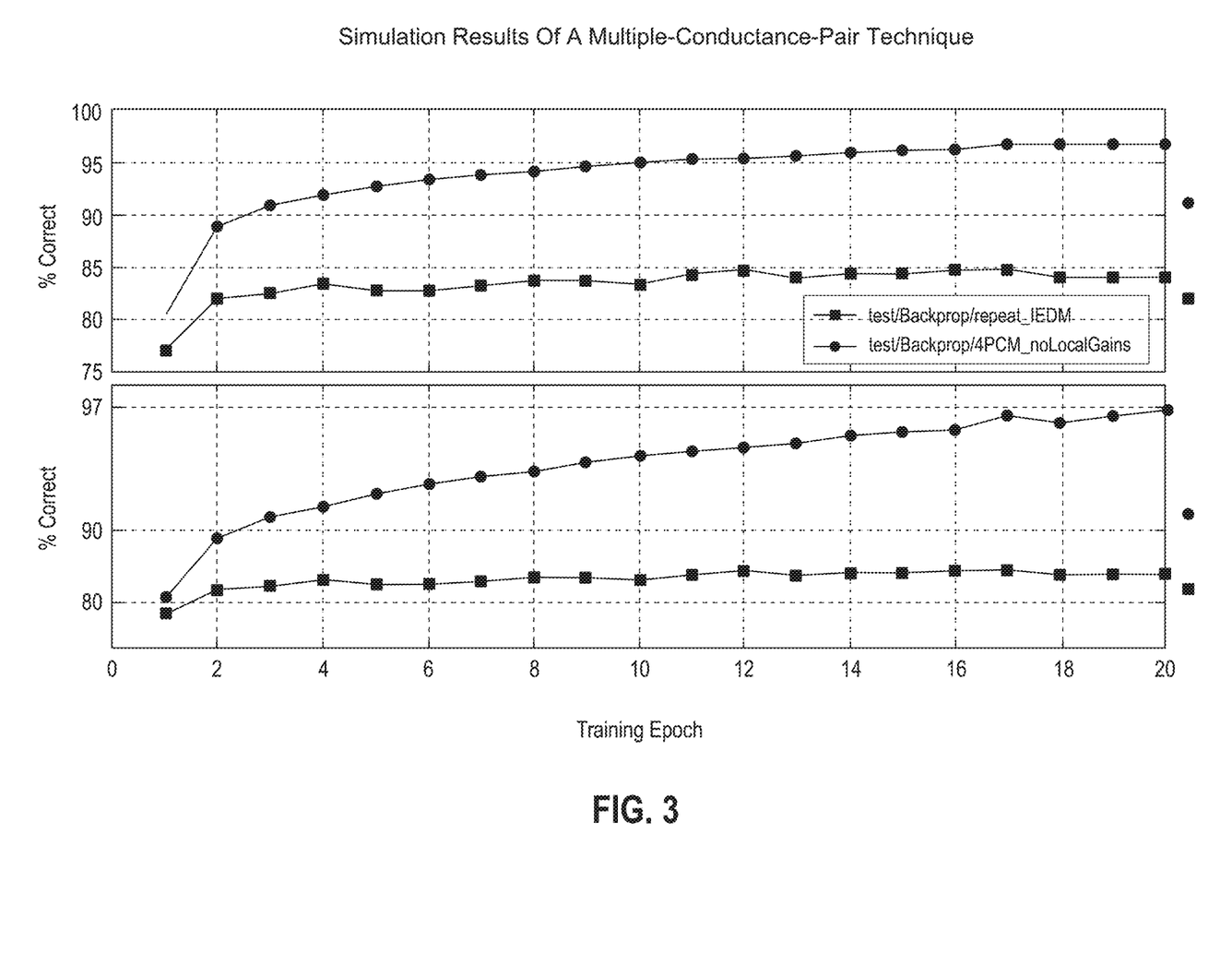
FIG. 3 depicts simulation results showing benefits of the multiple-conductance-pair technique.

When a large synaptic weight has been developed, this information is transferred from the large conductance difference in the less-significant conductance pair to a smaller (and thus more easily maintained) conductance difference in the next more-significant conductance pair. Since the more-significant conductance pairs are updated less frequently, this large synaptic weight is now better protected from being lost through the nonlinearities and asymmetries of the conductance, yet the network can still decrease this weight should it choose to do so. To a certain extent, the network has "banked" this weight into the conductance-pairs of higher significance. FIG. 3 shows that this improves performance notably under the same simulation conditions (assumptions concerning PCM imperfections) when compared to the baseline performance demonstrated experimentally [see paper to Burr et al., supra].

If, as in our experimental demonstrations to date [see paper to Burr et al., supra], training is already being paused periodically (after, say, every 100-1000 examples) for "occasional RESET," then this provides a ready-made opportunity to include the weight transfer described in this invention. Since all of the conductances must be measured in order to identify those in need of RESET (which moves them from the "right side" to the "left side" of the G-diamond [see paper to Burr et al., supra], with the same measurement we can also identify the weights that are large in magnitude, and schedule a transfer of weight information from the lower-significance conductance-pair to the next higher-significance conductance-pair.

Alternatively, the less-significant conductance pair could be a volatile analog memory element such as a capacitor tied to the gate of a transistor, so long as at least one of the more significant conductance pairs offered sufficient non-volatility to support weight stability during training and subsequent readout of the trained weights.

Figure 4:
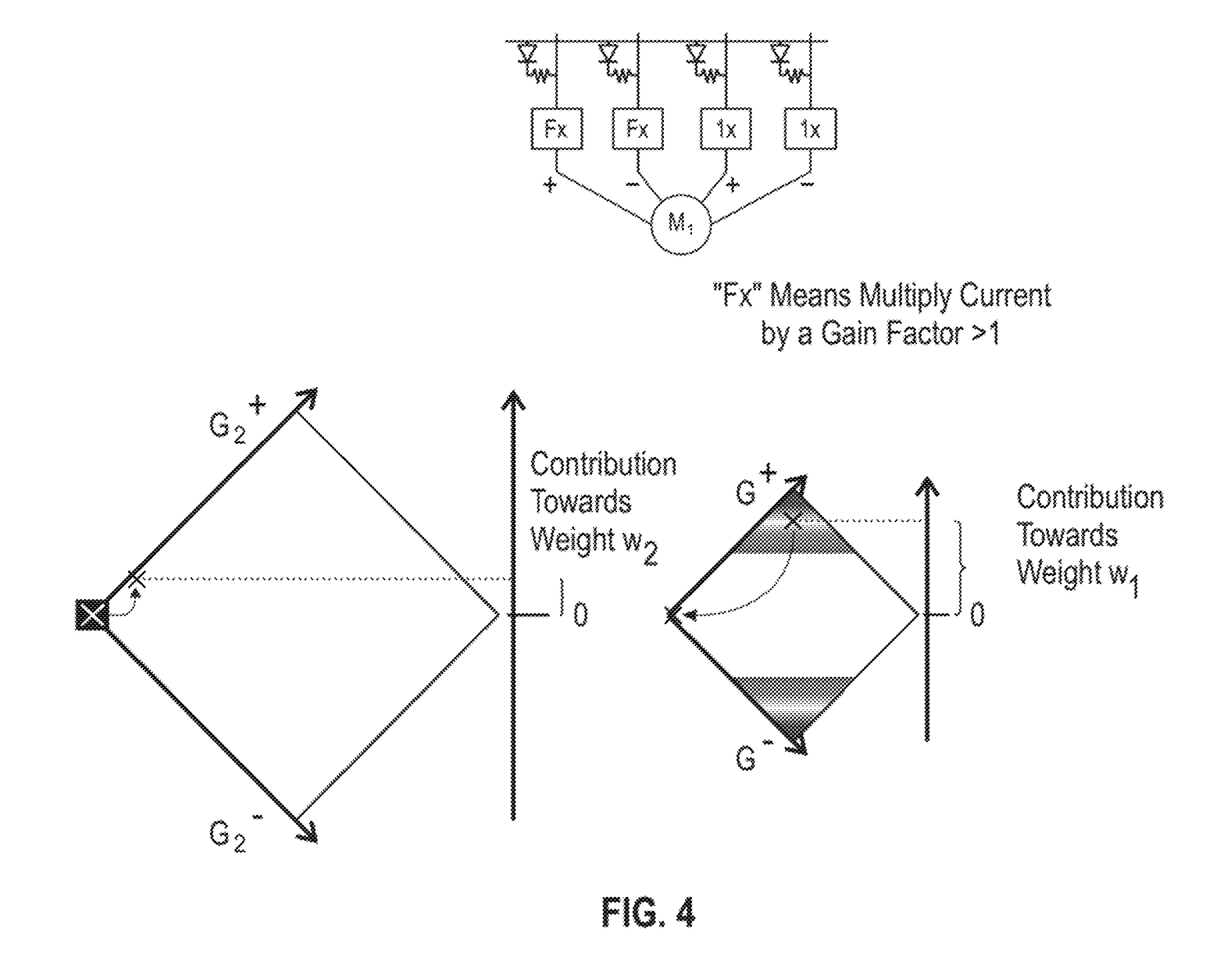
FIG. 4 illustrates the concept of having conductances of varying significance.

FIG. 4 illustrates the concept of having conductances of varying significance. Two G-diamonds are shown, scaled by the gain factor F. Thus, vertical position on these G-diamonds represents contribution to the overall synaptic weight. During the training process, forward evaluation and backpropagation use all conductances together with the associated gain factors to obtain the desired synaptic weight by simple integration of read currents. During programming, weight updates can be applied in a number of different schemes; in the embodiment shown here, weight updates are applied only to the lower significance conductance pair. At regular intervals, the transfer process can be initiated.

The transfer process involves measuring both conductances of the lower significance pair. In one embodiment shown in FIG. 4, only conductance pairs where the difference between the two conductances is large are transferred. In other embodiments, the conductance difference between the lower significance conductance pairs is always transferred to the more significant pair. Both lower-significance conductances are reprogrammed to equal conductances, zeroing out their joint contribution to the overall synaptic weight. Simultaneously, one or more of the more significant conductances is reconfigured in such a way that the overall synaptic contribution across both pairs is substantially unchanged. Because of the gain factor on the contribution of the more-significant pair, the change in conductance required for a similar impact on overall weight is F times smaller than in the less-significant conductance pair.

In a non-limiting example shown in FIG. 4, normal training is occasionally paused to measure all conductances. Then, conductances that correspond to the top or bottom of the lower-significance ("1×") G-diamond are identified, with both lower-significance conductances being RESET, and with one of the more-significant conductances being iteratively SET until the same effective weight is obtained. For example, let the weight be F w2+w1 and assuming, after training, w1 has become large (as shown in the G+, G− conductance graph), w1 is brought down to 0, and w2 is pushed up by $\Delta w2=w1/F$ (as shown in the G2+, G2− conductance graph). Such conductance reconfigurations allow for the weight to be better protected from NVM imperfections.

Again, in alternative embodiments in which bidirectional conductance change of any one conductance is feasible, one member of each conductance pair can be shared amongst multiple synapses, with all programming (weight update and weight transfer) taking place on the unique or non-shared conductance.

It should be noted that since this technique will amplify any random read noise on the higher-significance conductance-pair, there will likely be a limit on the largest gain factor that should be used. In addition, these gain factors mean that damaged conductances that end up "stuck-ON" in a high-conductance state are even more problematic to the performance of the neural network than in the prior-art configuration. However, it should be noted that conductances may be intentionally placed in a low-conductance state to protect failed access devices (see, for example, U.S. Pat. No. 8,811,060 to Burr et al.) and, therefore, can readily be adapted to greatly reduce the number of such "stuck-ON" conductances.

In one embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the synaptic weight of each synapse being represented by a weighted current flow from multiple conductance-pairs, where a plurality of training examples are serially input to the ANN while observing its output, where a backpropagation algorithm updates the synaptic weight in response to the difference between the output from a given layer and a desired output from said given layer, the method comprising: (a) periodically transferring a portion of the synaptic weight from a conductance-pair of lower significance to a conductance-pair of higher significance such that the total synaptic weight remains substantially unchanged; and (b) repeating the training examples until the network output approaches the desired output within a predetermined accuracy.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weighted current flow from multiple conductance pairs, each of the multiple conductance pairs representing a joint contribution and having a higher-significance conductance-pair and a lower-significance conductance-pair, where a plurality of training examples are serially input to the ANN while observing its output from said given layer, the method comprising: (a) pausing training and measuring conductances across analog memory elements in the ANN network; (b) identifying at least one measured conductance in a given conductance pair whose absolute value is greater than its paired conductance by a predetermined amount; and (c) reconfiguring the lower-significance conductance pairs to be substantially equal, corresponding to a zero joint contribution towards an overall synaptic weight, and reconfiguring one of the more-significant conductance pairs until a similar effective synaptic weight value is obtained.

Figure 5:
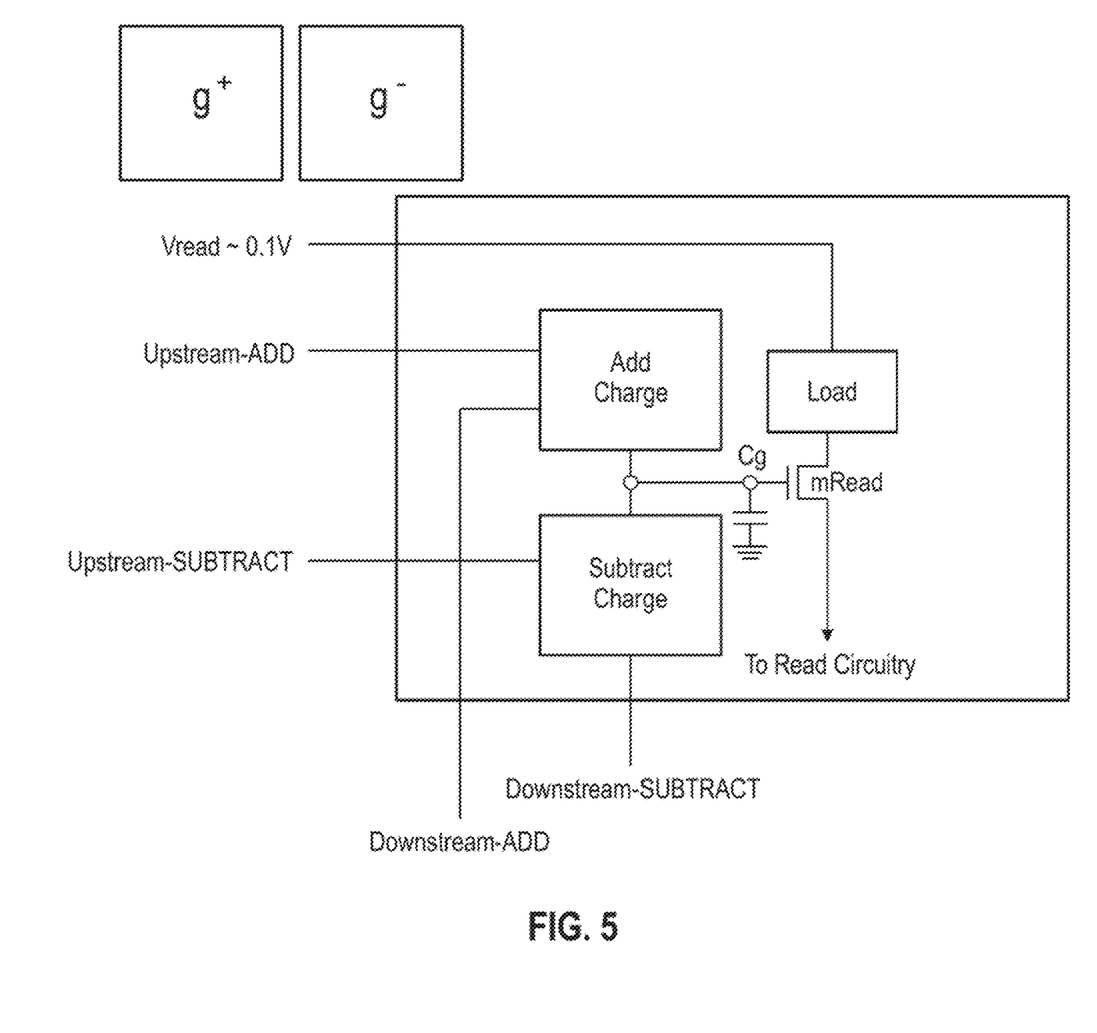
FIG. 5 depicts synaptic weights in the ANN implemented using an analog memory element, such as a capacitor, that is tied to the gate of a read transistor along with programming transistors (for adding charge to and subtracting charge from the capacitor) according to signals associated with the downstream and upstream neurons.

In one embodiment, as shown in FIG. 5, synaptic weights in ANN are implemented using an analog memory element such as a capacitor, Cg, tied to the gate of a read transistor, mRead, together with programming circuitry, e.g., Add charge block and a Subtract-charge block comprising one or more transistors, for adding charge to and subtracting charge from the capacitor, Cg, according to signals associated with the downstream and upstream neurons: Upstream-ADD, Upstream-SUBTRACT, Downstream-ADD, and Downstream-SUBTRACT, respectively. In such a scenario, one element of each pair (of conductance pairs) is shared across many synapses, and the lower conductance pair might be composed of a volatile analog memory (instead of non-volatile memory) comprising a capacitor, Cg, tied to the gate of a read transistor, mRead (e.g., modulating its effective conductance). A LOAD block (comprising some combination of resistors and/or transistors) can be included in series with the read transistor, mRead, in order to limit the maximum read current.

Figure 6:
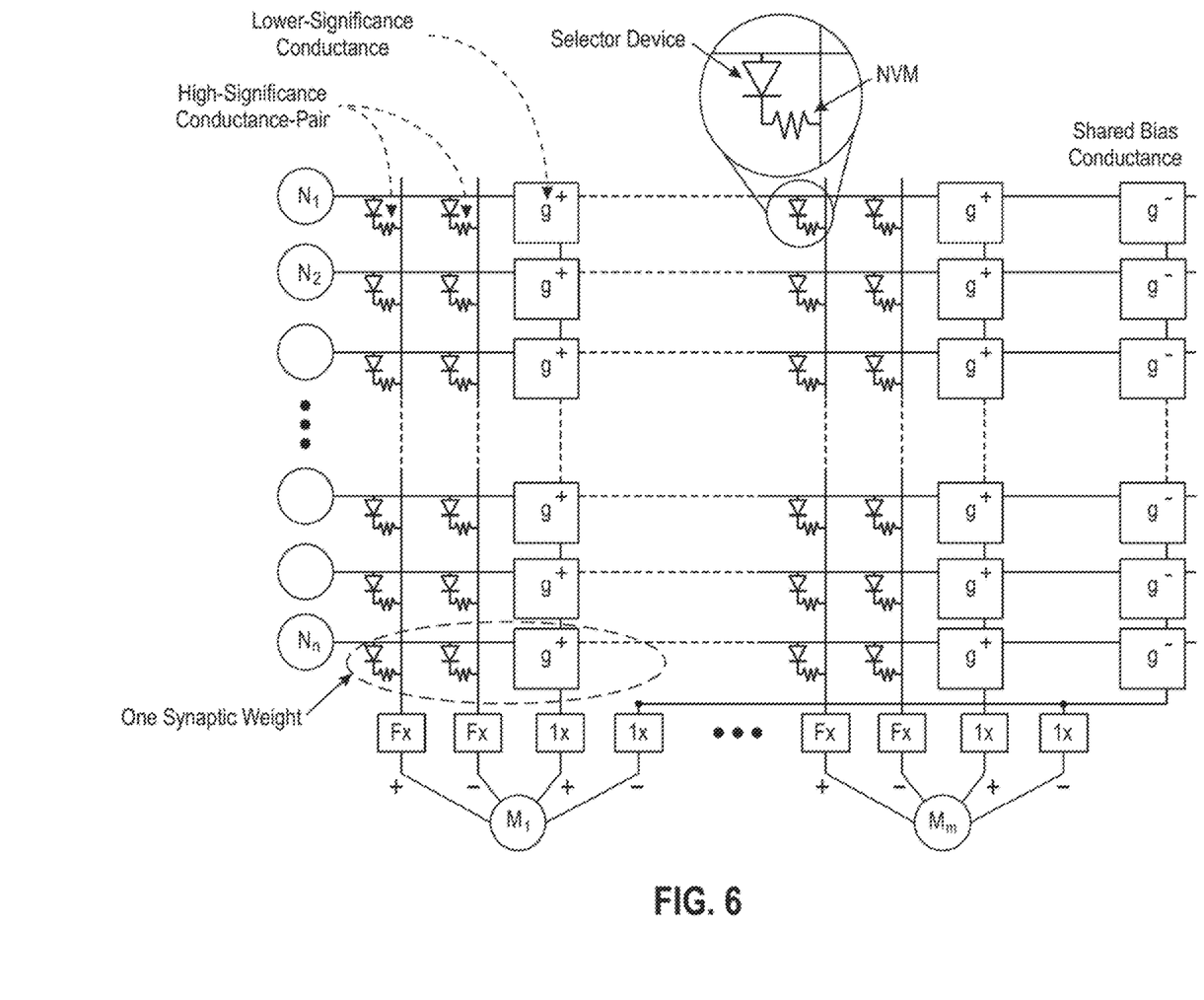
FIG. 6 illustrates another embodiment depicting the higher-significance conductance and lower-significance pairs of the present invention as used with a shared bias conductance.

Embodiments are envisioned that include both, as shown in FIG. 6, i.e., two PCM as more-significant, one 3T+1C conductance in each synapse, e.g., "g+", and then every 8 or 16 synapses share one additional 3T+1C unit cell, e.g., "g−". In such embodiments, one transistor is the read transistor whose conductance is modulated by the analog capacitor voltage, and one transistor is used to isolate the capacitor, except when pulling up its voltage (adding charge), and another transistor is used to isolate except when pulling down its voltage (removing charge).

Figure 7:
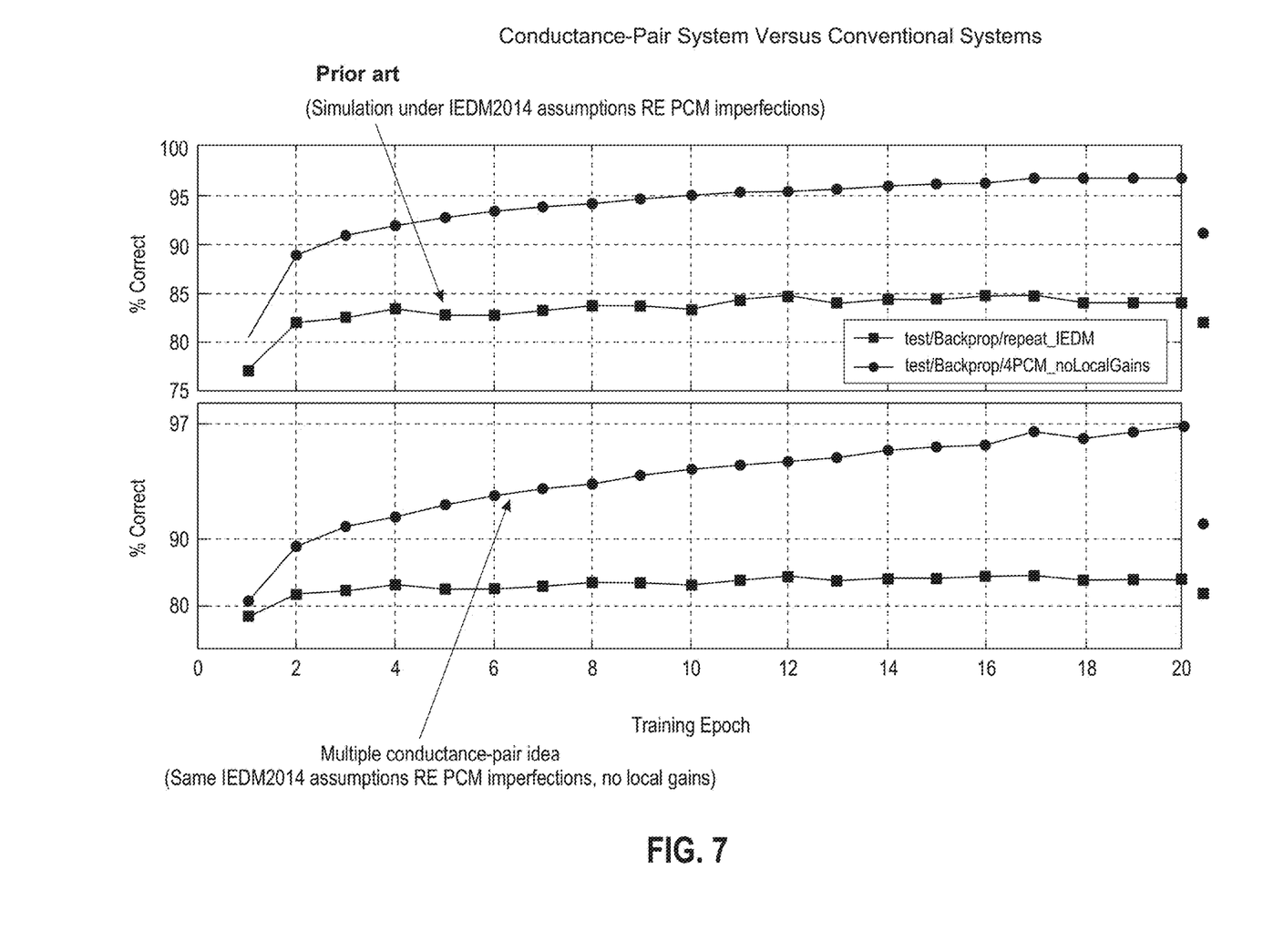
FIG. 7 illustrates the accuracy of the present invention's conductance-pair idea as compared to prior art systems.

FIG. 7 depicts simulations showing the efficiency of the present invention's multiple conductance-pair idea as compared to the prior art. Plotted are training accuracy as a function of training epoch (number of times that the same 5000 training examples are presented to the network), as well as the final test accuracy (star symbols outside right edge of the graph). The blue curve and symbols show our matched simulation from our prior art publication (one pair of PCM devices with nonlinear conductance response IEDM 2014), while the red curve shows the simulated effect of using two pairs of similarly nonlinear PCM devices, with weight transferred periodically from the lower-significance conductance pair to the higher-significance conductance pair. Performance is better because the effective dynamic range is larger, and because large weight values developed by the network are better protected from unintended weight loss than might otherwise be caused by the imperfections of the PCM devices. The lower curves simply replot the same data from the upper plot, but on a log scale that stretches out the vertical axis for high accuracy values.

CONCLUSION

A system and method has been shown in the above embodiments for the effective implementation of a system and method for constructing synaptic weights for artificial neural networks from signed analog conductance-pairs of varying significance. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method implemented in an artificial neural network (ANN), the method comprising:
periodically transferring a portion of a synaptic weight from a conductance-pair of lower significance to a conductance-pair of higher significance of the ANN, such that an overall synaptic weight remains unchanged, wherein the conductance pair of the lower significance is connected to a first gain factor and the conductance pair of the higher significance is connected to a second gain factor, wherein the first gain factor of the lower significance is lower than the second gain factor of the higher significance pair, wherein the ANN comprises a plurality of neurons arranged in layers with outputs of one layer connected to inputs of a plurality of the neurons of a subsequent layer, wherein the plurality of neurons are connected to each other via a plurality of synapses, each of the synapses having a synaptic weight encoding a connection strength between two connected neurons, a magnitude of the synaptic weight of each synapse being represented by a weighted current flow from multiple conductance-pairs, wherein a plurality of training examples are serially input to the ANN while observing its output, where a backpropagation algorithm updates the synaptic weight in response to a difference between an output from a given layer and a desired output from said given layer; and repeating the training examples until the network output reaches the desired output within a predetermined accuracy.

2. The method of claim 1, wherein the plurality of neurons are implemented with CMOS circuitry.

3. The method of claim 1, wherein the synaptic weights in the ANN are implemented using an analog memory element.

4. The method of claim 3, wherein the analog memory element is a non-volatile memory (NVM).

5. The method of claim 4, wherein the NVM is selected from the group consisting of: phase-change memory, resistive random access memory, and conducting bridge random access memory.

6. The method of claim 1, wherein one or more of the synaptic weights in the ANN are implemented using a capacitor tied to the gate of a read transistor, the gate of the read transistor also tied to an add charge block for adding charge to the capacitor and a subtract charge block for subtracting charge block from the capacitor, the adding or subtracting done according to signals associated with downstream and upstream neurons.

7. The method of claim 1, wherein the ANN is used as part of an application that is selected from the group consisting of: pattern recognition applications, image recognition applications, speech recognition applications, and language processing applications.

8. A method implemented in an artificial neural network (ANN), the method comprising:

pausing network training and measuring conductances across analog memory elements in the ANN network, wherein the ANN comprises a plurality of neurons arranged in layers with outputs of one layer connected to inputs of a plurality of neurons of a subsequent layer, wherein the plurality of neurons are connected to each other via a plurality of synapses, each of the synapses having a synaptic weight encoding a connection strength between two connected neurons, a magnitude of the weight of each of the synapses represented by a weighted current flow from multiple conductance pairs, each of the multiple conductance pairs representing a joint contribution having a higher-significance conductance-pair and a lower-significance conductance-pair, wherein the higher-significance conductance pair is connected to a second gain factor that is greater than a first gain factor connected to the lower-significance conductance pair, where a plurality of training examples are serially input to the ANN while observing its output, where a backpropagation algorithm updates the synaptic weight in response to a difference between an output from a given layer and a desired output from said given layer;

identifying an effective synaptic weight value in one or more measured conductances in the lower-significance conductance pair and the higher-significance conductance pair whose absolute value is greater than a conductance pair of the lower-significance conductance pair and the higher-significance conductance pair, respectively, by a predetermined amount; and reconfiguring the one or more measured conductances of the lower-significance conductance pairs to be equal, corresponding to a zero joint contribution towards an overall synaptic weight, and reconfiguring one of the higher-significant conductance pairs until the identified effective synaptic weight value is obtained, wherein reconfiguring the lower-significance conductance pairs and the higher-significance conductance pairs comprises transferring a portion of the synaptic weight from the lower-significance conductance pair to the higher-significance conductance pair.

9. The method of claim 8, wherein the plurality of neurons are implemented with CMOS circuitry.

10. The method of claim 8, wherein the synaptic weights in the ANN are implemented using a non-volatile memory (NVM).

11. The method of claim 9, wherein the NVM is selected from the group consisting of: phase-change memory, resistive random access memory, and conducting bridge random access memory.

12. The method of claim 8, wherein one or more of the synaptic weights in the ANN are implemented using a capacitor tied to the gate of a read transistor, together with programming transistors for adding charge to, and subtracting charge from, the capacitor according to signals associated with downstream and upstream neurons.

13. The method of claim 8, wherein the ANN is used as part of an application that is selected from the group consisting of: pattern recognition applications, image recognition applications, speech recognition applications, and language processing applications.

14. A method implemented in an artificial neural network (ANN), the method comprising:

pausing network training and measuring one or more conductances across analog memory elements in the ANN network, wherein the ANN comprises a plurality of neurons arranged in layers with outputs of one layer connected to inputs of a plurality of the neurons of a subsequent layer, wherein the plurality of neurons are connected to each other via a plurality of synapses, each of the synapses having a synaptic weight encoding a connection strength between two connected neurons, a magnitude of the weight of each of the synapses represented by a weighted current flow from multiple conductance pairs, each of the multiple conductance pairs representing a joint contribution having a higher-significance conductance-pair and a lower-significance conductance-pair, wherein the higher-significance conductance pair is connected to a second gain factor that is greater than a first gain factor connected to the lower-significance conductance pair, where a plurality of training examples are serially input to the ANN while observing its output, where a backpropagation algorithm updates the synaptic weight in response to a difference between an output from a given layer and a desired output from said given layer;

identifying an effective synaptic weight value in one or more measured conductances in the lower-significance conductance pair and the higher-significance conductance pairs whose absolute value is greater than a conductance pair of the lower-significance conductance pair and the higher-significance conductance pair, respectively, by a predetermined amount; and reconfiguring the lower-significance conductance pairs to be equal, and reconfiguring one of the higher-significant conductance pairs until the identified effective synaptic weight value is obtained, wherein reconfiguring the lower-significance conductance pairs and the higher-significance conductance pairs comprises transferring a portion of the synaptic weight from the lower-significance conductance pair to the higher-significance conductance pair of the ANN, and wherein one or more of the synaptic weights in the ANN are implemented using a capacitor tied to the gate of a read transistor, the gate of the read transistor also tied to an add charge block for adding charge to the capacitor and a subtract charge block for subtracting charge from the capacitor, the adding or subtracting done according to signals associated with downstream and upstream neurons.

15. The method of claim 14, wherein the plurality of neurons are implemented with CMOS circuitry.

16. The method of claim 14, wherein the synaptic weights in the ANN are implemented using a non-volatile memory (NVM).

17. The method of claim 14, wherein the NVM is selected from the group consisting of: phase-change memory, resistive random access memory, and conducting bridge random access memory.

* * * * *